B. GOODRICH.
Plow.
No. 60,715.
Patented Jan. 1, 1867.
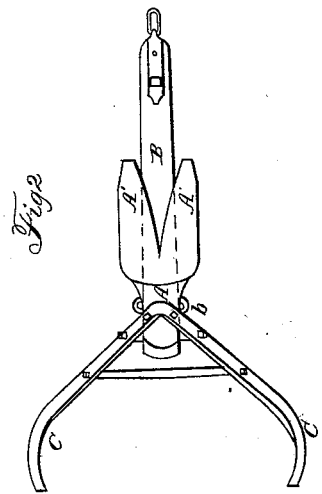
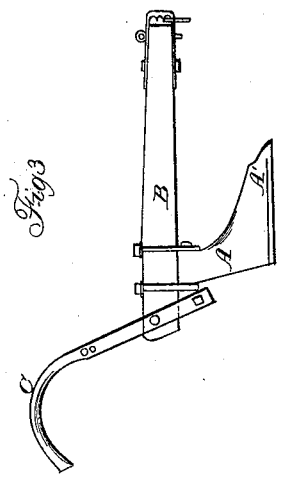
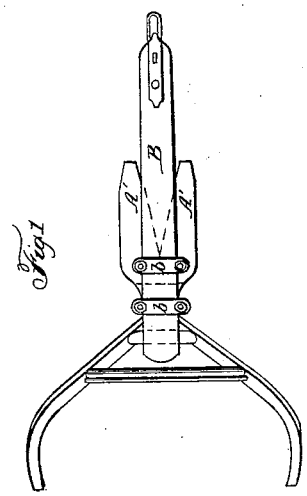
Witnesses
Geo. H. Andrews.
Samuel R. Piper.
Inventor
Barnard Goodrich
by his attorney
R. H. Eddy

United States Patent Office.

BARNARD GOODRICH, OF BRENTWOOD, NEW HAMPSHIRE.

Letters Patent No. 60,715, dated January 1, 1867.

---

IMPROVEMENT IN ROOT EXTRACTOR.

---

*The Schedule referred to in these Letters Patent and making part of the same.*

---

TO ALL PERSONS TO WHOM THESE PRESENTS SHALL COME:

Be it known that I, BARNARD GOODRICH, of Brentwood in the county of Rockingham, and State of New Hampshire, have invented a new and useful Bush and Root Extractor, or extracting plough; and I do hereby declare the same to be fully described in the following specification, and represented in the accompanying drawings, of which—

Figure 1 is a top view.

Figure 2, a bottom view; and

Figure 3, a side elevation of it.

It consists of duplex-pronged share, a plough-beam, and handles, arranged and formed substantially as shown in the drawings, in which A is the duplex-pronged share, made with two feet or prongs, A' A', arranged at an acute angle with each other, each being formed flat on its bottom, and triangular in vertical and transverse section, and with a pointed or wedge-shaped nose. The duplex-pronged share, in the way of seizing a bush, is to operate like the claws of a hammer in seizing a nail when to be drawn by such hammer. The share is to extend from the plough-beam, B, in manner as represented, and is to be fastened thereto by clamps, $b$ $b$, or other suitable means, such beam being provided with handles, $c$ $c$, made and arranged with respect to it, like those of a common plough. The implement is to be used like a common plough, and, when used, is to be drawn into the earth, and so as to catch, between its prongs, a bush or root to be extracted from the land. This can easily be done by tipping it a little laterally, so as to cause the beam to pass alongside of the bush, so that the prongs may seize it. The implement so made, has been found very efficient in extracting juniper and other bushes or roots from land. It is also of use to a farmer in other respects.

I claim the bush or root extractor, made substantially as described, viz, of the duplex-pronged share, the beam, and handles, arranged and for use as specified.

BARNARD GOODRICH.

Witnesses:
R. H. EDDY,
F. P. HALE, Jr.